(12) United States Patent
Griffin

(10) Patent No.: US 9,285,836 B2
(45) Date of Patent: Mar. 15, 2016

(54) PORTABLE ELECTRONIC DEVICE INCLUDING TOUCH-SENSITIVE DISPLAY

(75) Inventor: Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 182 days.

(21) Appl. No.: 12/966,819

(22) Filed: Dec. 13, 2010

(65) Prior Publication Data

US 2012/0146911 A1    Jun. 14, 2012

(51) Int. Cl.
| | |
|---|---|
| *G06F 3/02* | (2006.01) |
| *G06F 3/041* | (2006.01) |
| *G09G 5/00* | (2006.01) |
| *G06F 1/16* | (2006.01) |
| *G06F 3/0488* | (2013.01) |

(52) U.S. Cl.
CPC .......... *G06F 1/1662* (2013.01); *G06F 3/04886* (2013.01)

(58) Field of Classification Search
CPC .............. G06F 3/04886; G06F 3/0482; G06F 3/02442; G06F 1/662; G06F 1/626
See application file for complete search history.

(56) References Cited

U.S. PATENT DOCUMENTS

| | | | |
|---|---|---|---|
| 5,311,175 A | 5/1994 | Waldman | |
| 6,781,575 B1 * | 8/2004 | Hawkins et al. | 345/173 |
| 7,439,959 B2 | 10/2008 | Griffin et al. | |
| 7,525,534 B2 | 4/2009 | Skillman et al. | |
| 7,658,561 B2 | 2/2010 | Vuong | |
| 7,658,562 B2 | 2/2010 | Suess | |
| 7,694,231 B2 | 4/2010 | Kocienda et al. | |
| 7,819,595 B2 | 10/2010 | Matsuda | |
| 2001/0048428 A1 | 12/2001 | Ukita et al. | |
| 2002/0190957 A1 * | 12/2002 | Lee et al. | 345/169 |
| 2004/0165924 A1 | 8/2004 | Griffin | |
| 2007/0030249 A1 | 2/2007 | Griffin et al. | |
| 2007/0042807 A1 * | 2/2007 | Khoo | 455/557 |

(Continued)

FOREIGN PATENT DOCUMENTS

| | | |
|---|---|---|
| EP | 0982910 A1 | 3/2000 |
| EP | 2000884 A1 | 12/2008 |

(Continued)

OTHER PUBLICATIONS jbrink.net, LLC: "TouchTerm 2.3 Guide", Dec. 25, 2008, XP002635296, Retrieved from the Internet: URL:http://www.ajidev.com/jbnet/touchterm/tt_guide.html [retrieved on May 3, 2011].

(Continued)

*Primary Examiner* — William Boddie
*Assistant Examiner* — Alecia D English
(74) *Attorney, Agent, or Firm* — Geoffrey Dekleine; Borden Ladner Gervais LLP

(57) ABSTRACT

According to one aspect, a portable electronic device includes a body having a front face, a touch-sensitive display exposed at the front face of the body, a keyboard at the front face, the keyboard associated with a first plurality of characters excluding numerical characters, such that keys of the keyboard are each associated with a respective single one of the first plurality of characters, a memory, and a processor. The processor is coupled to the touch-sensitive display, the keyboard, and the memory to execute a program stored in the memory to cause the portable electronic device to display a second plurality of characters utilizing the touch-sensitive display in response to receipt of an input to display the second plurality of characters.

7 Claims, 6 Drawing Sheets

(56) References Cited

U.S. PATENT DOCUMENTS

| | | | |
|---|---|---|---|
| 2007/0126703 A1 | 6/2007 | Griffin et al. | |
| 2007/0155434 A1 | 7/2007 | Jobs et al. | |
| 2008/0055263 A1 | 3/2008 | Lemay et al. | |
| 2008/0094258 A1* | 4/2008 | Lee | 341/22 |
| 2008/0138135 A1 | 6/2008 | Gutowitz | |
| 2008/0266262 A1 | 10/2008 | Duarte et al. | |
| 2008/0318617 A1 | 12/2008 | Ladouceur et al. | |
| 2009/0051669 A1 | 2/2009 | Shin | |
| 2009/0058809 A1 | 3/2009 | Vuong et al. | |
| 2009/0137279 A1 | 5/2009 | Silfverberg | |
| 2009/0269118 A1 | 10/2009 | Wilson | |
| 2010/0302278 A1* | 12/2010 | Shaffer et al. | 345/659 |

FOREIGN PATENT DOCUMENTS

| | | |
|---|---|---|
| WO | 03/030497 A2 | 4/2003 |
| WO | 2005/109652 A2 | 11/2005 |
| WO | 2010/029448 A1 | 3/2010 |

OTHER PUBLICATIONS jbrink.net, LLC: "TouchTerm 2.3 Guide", Dec. 25, 2008, XP002635297, Retrieved from the Internet: URL:http://replay.web.archive.org/20081225094309/http://jbrink.net/touchterm/tt_guide.html [retrieved on May 3, 2011].

TouchTerm Support: "TouchTerm new overlay keyboard", Nov. 22, 2008, XP002635304, Retrieved from the Internet: URL:http://groups.google.com/group/touchterm/browse_thread/thread/8f0ff0b6fd5aef9a [retrieved on May 3, 2011].

EESR dated Jun. 6, 2011 issued in respect of the corresponding European patent Application No. 10194708.3.

Office Action dated Aug. 14, 2013, issued from the corresponding European patent application No. 10194708.3.

Office Action dated Jan. 6, 2014, issued from the corresponding Chinese patent application No. 201110405118.9.

Examiners Report dated Nov. 5, 2013, issued from the corresponding Canadian patent application No. 2,761,454.

Summons to attend oral proceedings dated Apr. 30, 2014, issued from the corresponding European patent application No. 10194708.3.

Office Action dated Sep. 9, 2014, issued from the corresponding Chinese patent application No. 201110405118.9.

Office Action dated Mar. 18, 2015, issued from the corresponding Chinese patent application No. 201110405118.9.

* cited by examiner

PORTABLE ELECTRONIC DEVICE INCLUDING TOUCH-SENSITIVE DISPLAY

FIELD OF TECHNOLOGY

The present disclosure relates to portable electronic devices including touch-sensitive displays and the control of such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in electronic devices with touch-sensitive displays are desirable.

DETAILED DESCRIPTION

Figure 1:
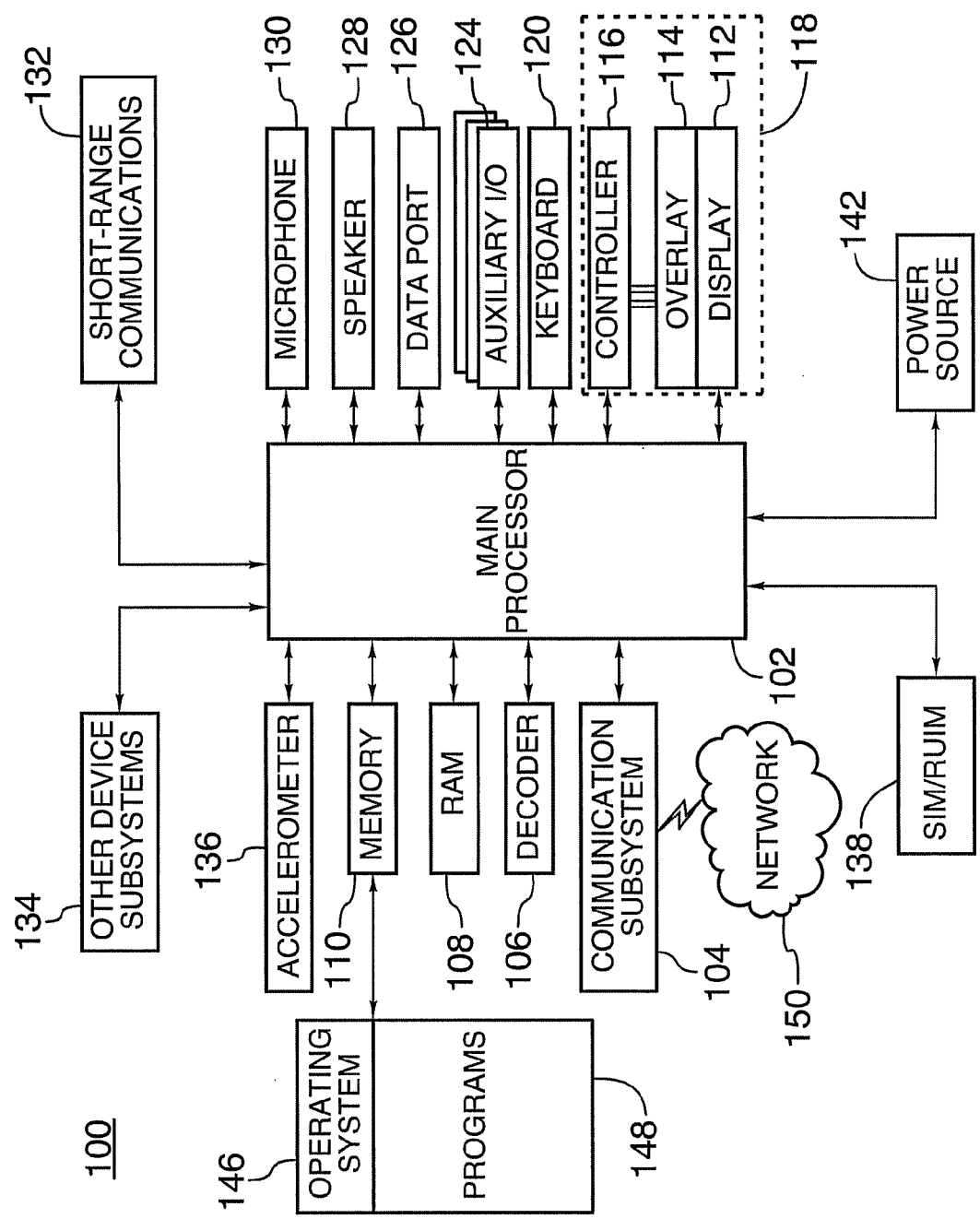
FIG. 1 is a simplified block diagram of one example of a portable electronic device in accordance with the present disclosure.

The following describes a portable electronic device includes a body having a front face, a touch-sensitive display exposed at the front face of the body, a keyboard at the front face, the keyboard associated with a first plurality of characters excluding numerical characters, such that keys of the keyboard are each associated with a respective single one of the first plurality of characters, a memory, and a processor. The processor is coupled to the touch-sensitive display, the keyboard, and the memory to execute a program stored in the memory to cause the portable electronic device to display a second plurality of characters utilizing the touch-sensitive display in response to receipt of an input to display the second plurality of characters.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected or coupled to an electronic controller 116 that together comprise a touch-sensitive display 118, a keyboard 120, an auxiliary input/output (I/O) subsystem 124, a data port 126, a speaker 128, a microphone 130, short-range communications 132, and other device subsystems 134. The processor 102 may optionally interact with one or more actuators (not shown) to provide tactile feedback and one or more force sensors (not shown) to detect a force imparted on the touch-sensitive display 118. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

Alternatively, the keyboard 120 may be coupled to a controller that is coupled to the processor 102 to identify characters associated with keys.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 may also be configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The direction may be referenced with respect to the touch-sensitive display 118, the orientation of the information displayed on the touch-sensitive display 118, or another reference. The origin point and the finishing point of the swipe may be utilized to determine the magnitude or distance of the swipe. The duration of the swipe may be determined from the origin point and finishing point of the swipe in time. The processor 102 receives data from the controller 116 to determine the direction, magnitude, and duration of the swipe.

Figure 2:
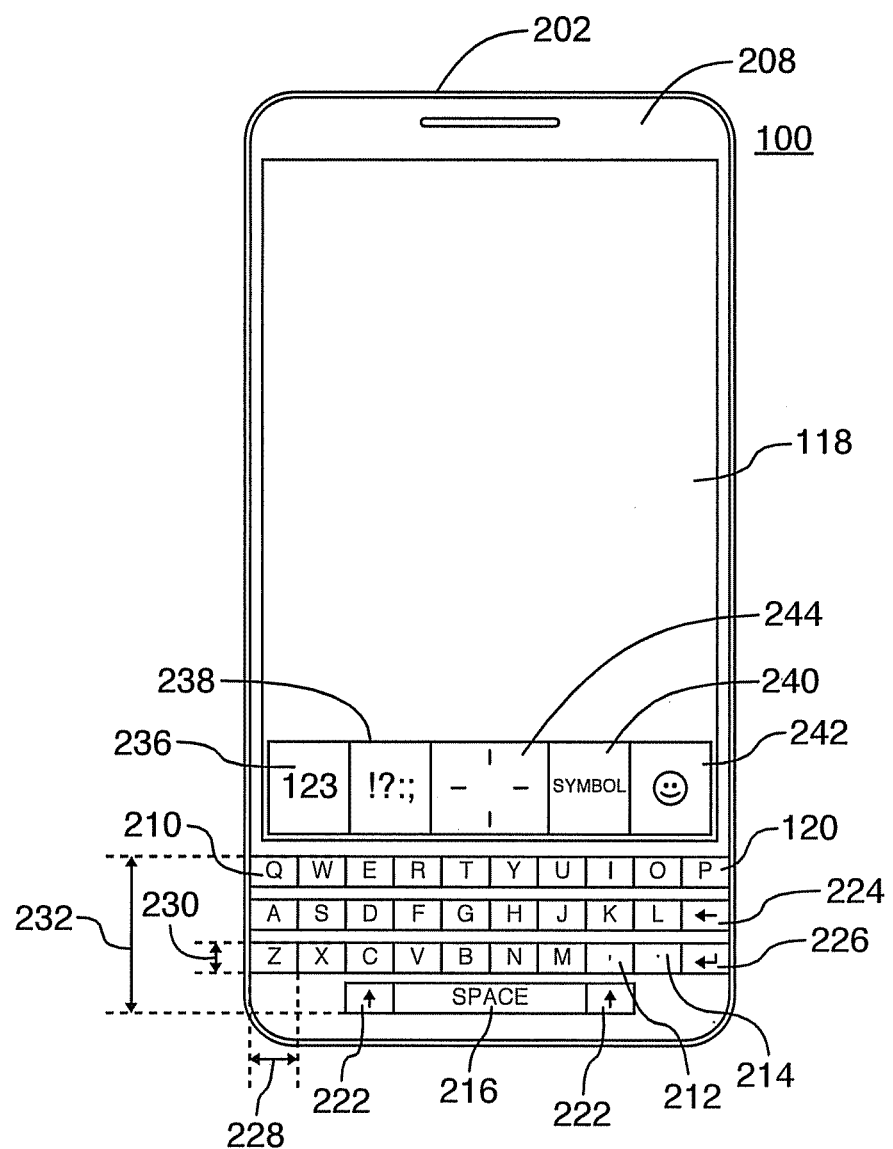
FIG. 2 is a front view of an example of a portable electronic device in accordance with the present disclosure.

A front view of an example of the portable electronic device 100 is shown in FIG. 2. The portable electronic device 100 includes a body 202 that includes a back, sidewalls, and a front face 208. The touch-sensitive display 118 is disposed in the body 202 and exposed at the front face 208 for user-interaction.

The keyboard 120 may be a physical keyboard such as a mechanical keyboard 120 that includes a plurality of mechanical keys 210 that, when depressed, send a signal to the processor 120. The keyboard is also located in the front face 208 of the body 202 and, in the orientation of the portable electronic device 100 shown in the example of FIG. 2, is located under the touch-sensitive display 118. In the present example, the keyboard 120 includes four rows of mechanical keys 210. Alternatively, fewer rows of keys may be utilized.

Each of the mechanical keys 210 of the keyboard 120 is associated only with a single alphabetical character, punctuation mark, or keyboard function. Thus, each one of the mechanical keys 210 is associated with only one of an alphabetical character, a punctuation mark, and a keyboard function and none of the mechanical keys 210 are associated with numerical characters. In the example, shown, the keyboard is in a QWERTY keyboard layout. Other keyboard layouts including AZERTY, QWERTZ, and Dvorak keyboard layouts may be utilized.

In addition to keys associated with the alphabetical characters A through Z, two keys 212, 214 are associated with punctuation marks including the period and the comma, respectively, and one key 216 is associated with a space function, namely a space key 216 (also known as a spacebar). The remaining four keys are associated with functions, including two shift keys 222, a delete key 224 (also known as a backspace key), and an enter key 226 (also known as a return key). Thus, in the present example, the keyboard 120 includes 33 mechanical keys 210.

The aspect ratio of the key width 228 of the mechanical keys 210 to the key height 230 is about one as the key width 228 is approximately equal to the key height 230. In the present application, the term "key width" is utilized when referring to mechanical keys 210 to describe the dimension of the key in the horizontal direction, as illustrated by the reference numeral 228 shown in the portrait orientation of the portable electronic device 100 illustrated in FIG. 2. The term "key height" is utilized when referring to mechanical keys 210 to describe the dimension of the key in the vertical direction, as illustrated by the reference numeral 230 shown in the portrait orientation of the portable electronic device 100 illustrated in FIG. 2.

In the examples illustrated, the horizontal key pitch is greater than the vertical key pitch. Alternatively, the horizontal key pitch may be about equal to the vertical key pitch. The horizontal key pitch is the horizontal spacing from the middle of a key associated with an alphabetical letter to the middle of a horizontally adjacent key associated with an alphabetical letter. The vertical key pitch is the vertical spacing from the middle of a key associated with an alphabetical letter to the middle of a vertically adjacent key associated with an alphabetical letter. The terms horizontal and vertical are utilized with reference to the portable electronic device when in the portrait orientation illustrated in FIG. 2.

By associating each of the mechanical keys 120 with a single alphabetical character, punctuation mark, or keyboard function the key height 230 of the mechanical keys 210 may be reduced. The key height 230 of the keys 120 may be reduced as only a single character, or keyboard function representation is printed on each of the mechanical keys 120. Additional characters are not printed on the mechanical keys 120 and therefore less space is utilized for the representations. With reduced key height 230 and by excluding numerical keys from the keyboard, the total keyboard height 232 may also be reduced. The term "keyboard height" is utilized when referring to the keyboard as being the total dimension of the keyboard in the direction illustrated by the reference numeral 232 shown in the portrait orientation of the portable electronic device 100 illustrated in FIG. 2.

The touch-sensitive display 118 is shown in FIG. 2 in the portrait orientation in which the width of the touch-sensitive display 118 is less than the height of the touch-sensitive display 118. With the reduced keyboard height 232 of the keyboard 120 further space is available to accommodate the touch-sensitive display 118. The touch-sensitive display 118 extends over a majority of the front face 208 of the portable electronic device 100, providing increased display area in comparison to other portable electronic devices with mechanical keyboards.

Information in the form of characters may be entered on the touch-sensitive display 118 in any suitable application such as an electronic mail application, a calendar application, a web browser application, an address book application, or any other suitable application resident on or accessible utilizing the portable electronic device 100. To enter information in the form of characters on the touch-sensitive display 118, keys 210 of the mechanical keyboard 120 are depressed, resulting in a signal received at the processor 102. Alternatively, characters may be entered utilizing the touch-sensitive display 118. In the example shown in FIG. 2, options to provide further selectable characters are displayed on the touch-sensitive display 118. The options are displayed as virtual buttons and include, for example, a numerical character option 236, a punctuation option 238, a symbol option 240, and an emoticon option 242. A virtual navigation device 244 is also provided. The virtual navigation device 244 may act as a touchpad for controlling a cursor or other indicator on another portion of the touch-sensitive display 118, for example.

A touch at a location on the touch-sensitive display 118 that is associated with the numerical character option 236 causes display of a virtual keypad including the numerals 0 through 9. A numeral may be selected by a touch on the area associated with the numeral on the touch-sensitive display 118. A touch at a location on the touch-sensitive display 118 that is associated with the punctuation option 238 causes display of a plurality of buttons, each associated with a punctuation mark such as a semicolon, a colon, and others, for example. A punctuation mark may be selected by a touch on the area associated with the punctuation mark on the touch-sensitive display 118. A touch at a location on the touch-sensitive display 118 that is associated with the symbol option 240 causes display of a plurality of buttons, each associated with a symbol, such as a equal symbol, a plus symbol, or any other suitable symbol. A symbol may be selected by a touch on the area associated with the symbol on the touch-sensitive display 118. A touch at a location on the touch-sensitive display 118 that is associated with the emoticon option 242 causes display of a plurality of buttons, each associated with an emoticon. An emoticon may be selected by a touch on the area associated with the emoticon on the touch-sensitive display 118.

Thus, information may be entered utilizing the keyboard 120 and the touch-sensitive display 118. Alphabetical characters may be entered utilizing keys 210 of the keyboard 120. Numerals, for example, or other characters which are excluded from the keyboard 120, may be selected utilizing the touch-sensitive display 118.

Figure 3:
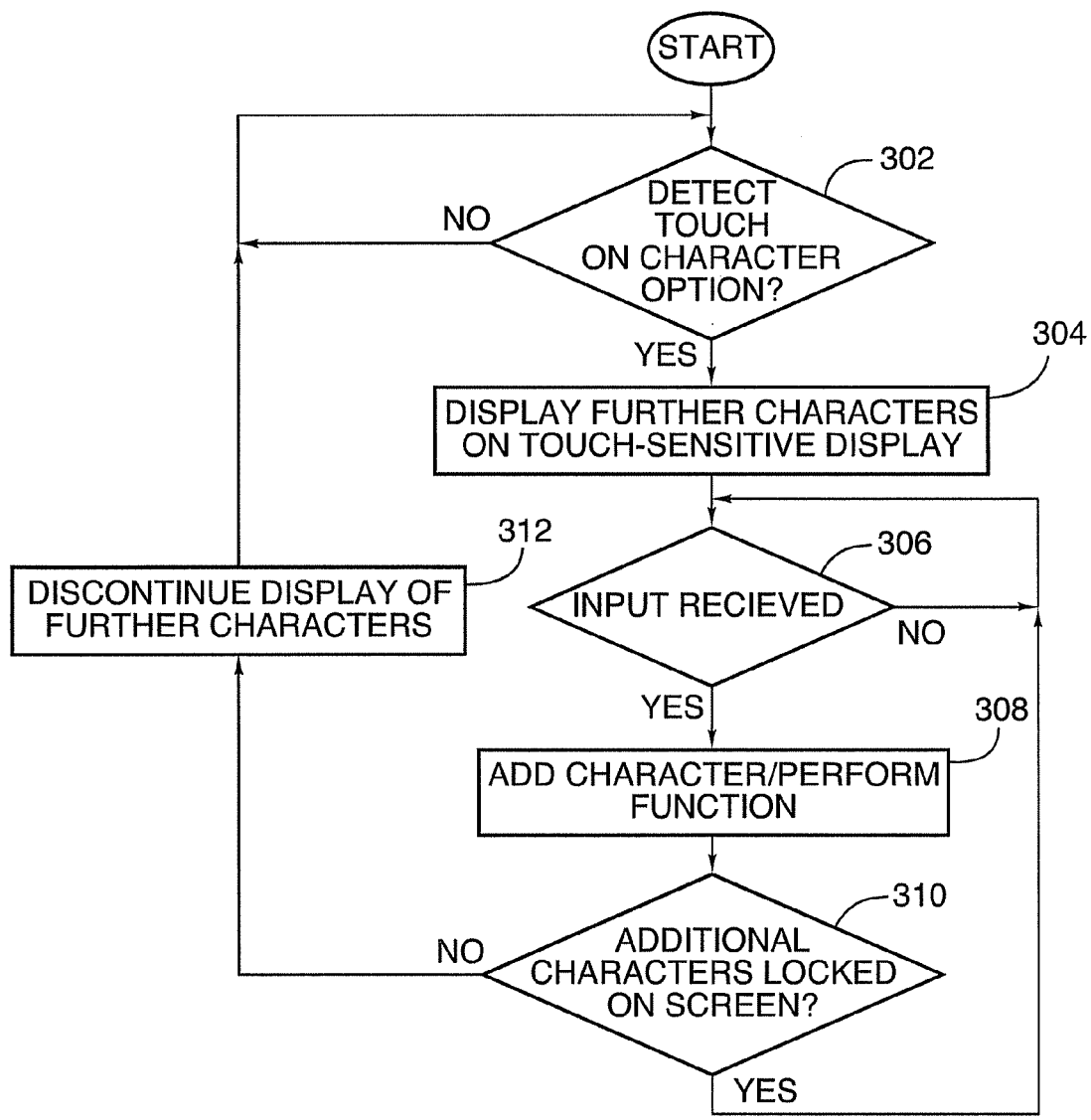
FIG. 3 is a flowchart illustrating an example of a method of controlling a portable electronic device in accordance with the present disclosure.

Reference is made to FIG. 3 to describe an example of a method of controlling an electronic device to enter information. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

When a touch is received on a character option on the touch-sensitive display at 302, further associated selectable characters, referred to as further characters, are displayed at 304. The further characters may include characters that are not associated with the mechanical keys 210 on the keyboard 120. When an input from either the keyboard 120 or from the touch-sensitive display 118 is received at 306, a function associated with the input is performed or a character associated with the input is entered at 308. The input may be depression of one of the mechanical keys 210 of the keyboard 120 associated with either a character or with a function. The input may be receipt of a touch on the touch-sensitive display 118. The touch may be detected at a location associated with a further character on the touch-sensitive display 118 or at a location associated with a function on the touch-sensitive display 118. When the further characters are locked on the touch-sensitive display at 310, display of the further characters continues and the process continues at 306. When the further characters are not locked on the touch-sensitive display at 310, display of the further characters on the touch-sensitive display is discontinued at 312 and the process continues at 302.

Figure 4:
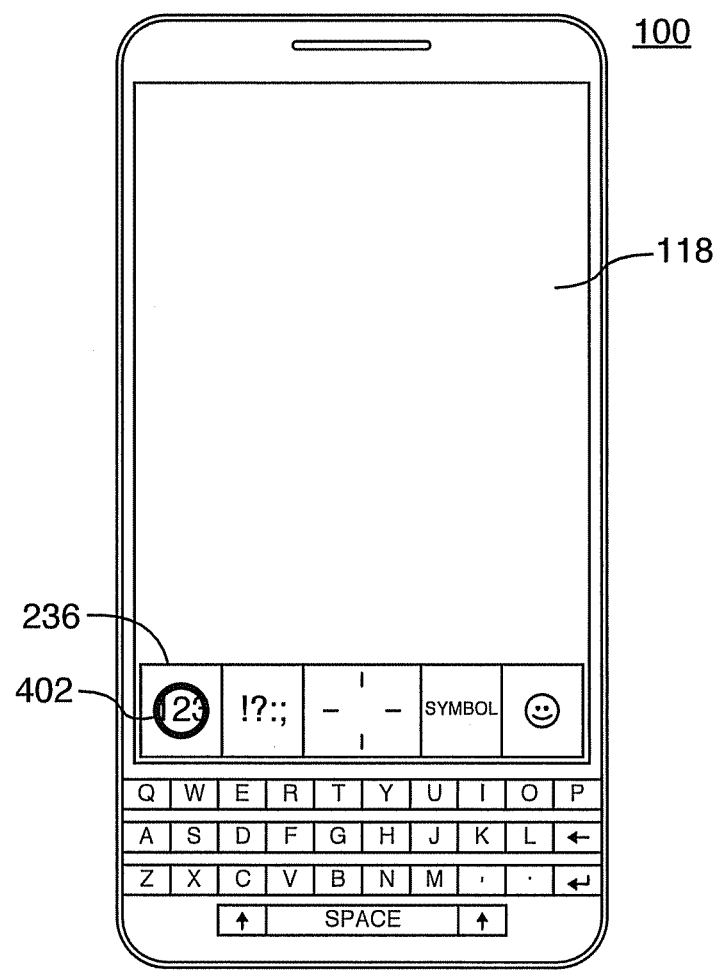
FIG. 4 and FIG. 5 illustrate examples of the portable electronic device of FIG. 2 receiving an input and displaying further characters.
Figure 5:
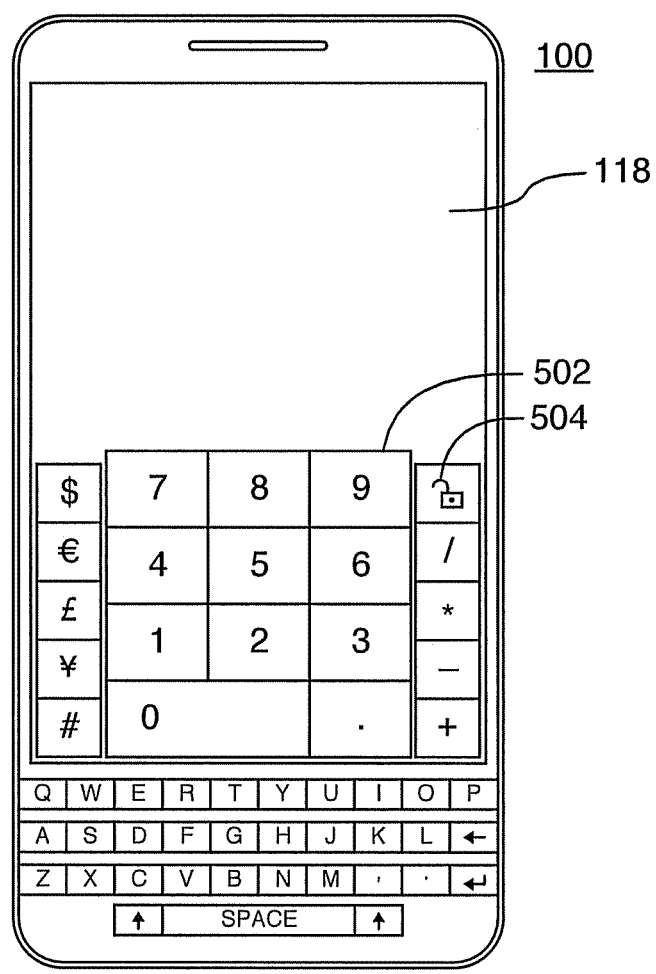

Continued reference is made to FIG. 3 and additionally to FIG. 4 and FIG. 5 which illustrate examples of the portable electronic device of FIG. 2 receiving an input and displaying further characters. For the purpose of the present example, a touch, illustrated by the circle 402, is detected on the numerical character option 236 at 302. The virtual keypad 502, including the numerals 0 through 9 and the decimal symbol, is displayed at 304. Additional virtual keys are provided for entry of, for example, a currency symbol, or a mathematical symbol. In the example illustrated, a lock key 504 is provided to lock the numerals 0 through 9 on the touch-sensitive display 118. When a touch is detected on the lock key 504 at 306, the further characters are locked on the touch-sensitive display 118 at 308 and therefore display of the further characters continues until another touch is received on the lock key 504 to unlock the characters.

When the characters are not locked on the screen, a touch on an area associated with one of the characters displayed, or depression of one of the mechanical keys 210 of the keyboard 120 at 306, results in display of the associated character or execution of the associated function at 308, and display of the further characters is discontinued at 312.

Thus, characters that are excluded from the keyboard 120 may be selected utilizing virtual keys that are selectively displayed in response to receipt of selection of an option to display the further characters.

Figure 6:
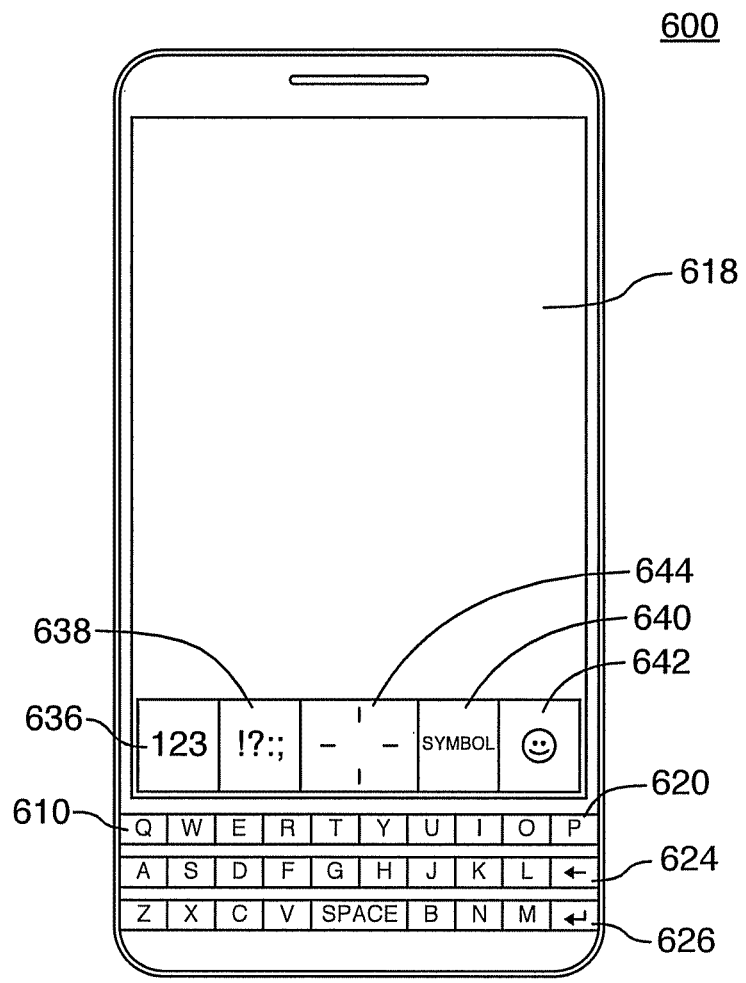
FIG. 6 illustrates another example of a portable electronic device in accordance with the present disclosure.

A front view of another example of another example of a portable electronic device 600 is shown in FIG. 6. The portable electronic device 600 of FIG. 6 is similar to the portable electronic device 100 described with reference to FIG. 2. Many of the features described with reference to the portable electronic device 600 of FIG. 6 are similar to the features of the portable electronic device of FIG. 2 and similar features may not be described again in detail.

The keyboard 620 is a mechanical keyboard such that the keyboard 620 includes a plurality of mechanical keys 610 that, when depressed, send a signal to the processor. The keyboard 620 in the present example includes three rows of mechanical keys 610.

Each of the mechanical keys 610 of the keyboard 620 is associated with only a single alphabetical character or keyboard function. Thus, each one of the mechanical keys 610 is associated with only one of an alphabetical character, and a keyboard function and none of the mechanical keys 610 are associated with numerical characters or with punctuation symbols. In the example, shown, the keyboard is in a QWERTY keyboard layout with a spacebar inserted between the key associated with the letter "V" and the key associated with the letter "B". Other keyboard layouts including AZERTY, QWERTZ, and Dvorak keyboard layouts may be utilized.

In addition to keys associated with the alphabetical characters A through Z, one key 616 is associated with a space function, namely a space key 216 (also known as a spacebar). The two remaining keys are associated with functions, including a delete key 624 (also known as a backspace key) and an enter key 626 (also known as a return key). Thus, in the present example, the keyboard 620 includes 29 mechanical keys 610.

The horizontal key pitch may be about equal to the vertical key pitch. The horizontal key pitch is the horizontal spacing from the middle of a key associated with an alphabetical letter to the middle of a horizontally adjacent key associated with an alphabetical letter. The vertical key pitch is the vertical spacing from the middle of a key associated with an alphabetical letter to the middle of a vertically adjacent key associated with an alphabetical letter.

The touch-sensitive display 618 is shown in FIG. 6 in the portrait orientation in which the width of the touch-sensitive display 618 is less than the height of the touch-sensitive display 618. With the reduced keyboard height of the keyboard 620 further space is available to accommodate the touch-sensitive display 618. The touch-sensitive display 618 extends over a majority of the front face of the portable electronic device 600, providing increased display area in comparison to other portable electronic devices with mechanical keyboards.

Information in the form of characters may be entered on the touch-sensitive display 618 in any suitable application. To enter information in the form of characters on the touch-sensitive display 618, keys of the mechanical keyboard are depressed, resulting in a signal received at the processor. Alternatively, characters may be entered utilizing the touch-sensitive display 618. In the example shown in FIG. 6, options to provide further selectable characters are displayed on the touch-sensitive display 618. The options are displayed as virtual buttons and include, for example, a numerical character option 636, a punctuation option 638, a symbol option 640, and an emoticon option 642. A virtual navigation device 644 is also provided. The virtual navigation device 644 may act as a touchpad for controlling a cursor or other indicator on another portion of the touch-sensitive display 618, for example.

Information may be entered utilizing the keyboard 620 and the touch-sensitive display 618. Alphabetical characters may be entered utilizing the keyboard 620. Numerals, punctuation, or other characters which are excluded from the keyboard 620, may be selected utilizing the touch-sensitive display 618.

Optionally, the mechanical keys 610 of the keyboard 620 may include touch sensors such that the mechanical keys 610 are also touch-sensitive. The use of touch-sensitive keys 610 facilitates further input or functionality utilizing the mechanical keys 610 of the keyboard 620. As indicated above, the keyboard is a physical keyboard. Rather than a mechanical keyboard 120 as described above, the keyboard 120 may be a touch-sensitive keyboard including touch-sensitive keys.

According to one aspect, a portable electronic device that includes a body having a front face, a touch-sensitive display exposed at the front face of the body, a keyboard at the front face, the keyboard associated with a first plurality of characters excluding numerical characters, such that keys of the keyboard are each associated with a respective single one of the first plurality of characters, a memory, and a processor. The processor is coupled to the touch-sensitive display, the keyboard, and the memory to execute a program stored in the memory to cause the portable electronic device to display a second plurality of characters utilizing the touch-sensitive display in response to receipt of an input to display the second plurality of characters.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A portable electronic device comprising:
a body having a front face;
a touch-sensitive display exposed at the front face of the body;
a mechanical keyboard at the front face, the mechanical keyboard having mechanical keys arranged in exactly three rows, a total number of the mechanical keys equalling twenty nine and each of the mechanical keys being associated with only one of: a single keyboard function and a single character and each of the mechanical keys having printed thereon a representation of only one of: a single keyboard function and a single character, the single character being one of a first plurality of characters that excludes numerical characters, punctuation marks, symbols, and emoticons and the single keyboard function being one of a plurality of keyboard functions;
a memory; and
a processor coupled to the touch-sensitive display, the keyboard, and the memory to execute a program stored in the memory to cause the portable electronic device to:
display, on the touch-sensitive display, a plurality of selectable options, each of the selectable options associated with a virtual keyboard comprising selectable buttons, the plurality of selectable options being provided in a single row on the touch-sensitive display adjacent to the mechanical keyboard;
in response to detecting a touch, on the touch-sensitive display, at a location associated with a first selectable option of the plurality of selectable options, displaying, on the touch-sensitive display, the virtual keyboard associated with the first selectable option, wherein the selectable buttons of the virtual keyboard are associated with one of: numerical characters, symbols, punctuation, and emoticons and wherein one of the selectable buttons of the virtual keyboard is a lock key that is selectable to lock the virtual keyboard on the touch-sensitive display and to unlock the virtual keyboard on the touch-sensitive display;
in response to detecting selection of one of the selectable buttons associated with one of a numerical character, a symbol, a punctuation mark, and an emoticon when the virtual keyboard is not locked on the touch-sensitive display, discontinue display of the virtual keyboard associated with the first selectable option;

in response to detecting selection of one of the selectable buttons associated with one of a numerical character, a symbol, a punctuation mark, and an emoticon when the virtual keyboard is locked on the touch-sensitive display, maintain display of the virtual keyboard associated with the first selectable option, wherein the mechanical keys of the mechanical keyboard include touch sensors to detect touches on the mechanical keys such that the mechanical keys are depressible to provide input to the processor and are touch-sensitive to provide further input to the processor.

2. The portable electronic device of claim 1, wherein the plurality of keyboard functions include an enter key and a delete key.

3. The portable electronic device according to claim 1, wherein the processor is configured to display a navigation device on the touch-sensitive display.

4. The portable electronic device according to claim 1, wherein a horizontal key pitch of the keys of the mechanical keyboard is about equal to a vertical key pitch.

5. The portable electronic device according to claim 1, wherein the touch-sensitive display covers a majority of the area of the front face.

6. A method of controlling a portable electronic device comprising a body having a front face, a touch-sensitive display exposed at the front face of the body, a mechanical keyboard at the front face, the mechanical keyboard having mechanical keys arranged in exactly three rows, a total number of the mechanical keys equalling twenty nine and each of the mechanical keys being associated with only one of: a single keyboard function and a single character and each of the mechanical keys having printed thereon a representation of the only one of: a single keyboard function and a single character, the single character being one of a first plurality of characters that excludes numerical characters, punctuation, symbols, and emoticons and the single keyboard function being one of a plurality of keyboard functions, the method comprising:

displaying, on the touch-sensitive display proximate to a top row of the exactly three rows including the twenty nine keys of the mechanical keyboard with representations of the only one of: a single keyboard function and a single character printed thereon, a plurality of selectable options, each of the selectable options associated with a virtual keyboard comprising selectable buttons, the plurality of selectable options being provided in a single row on the touch-sensitive display adjacent to the mechanical keyboard;

detecting a touch on the touch-sensitive display, at a location associated with a first selectable option of the plurality of selectable options; and in response to detecting the touch, on touch-sensitive display, the virtual keyboard associated with the first selectable option, wherein the selectable buttons of the virtual keyboard are associated with one of: numerical characters, symbols, punctuation, and emoticons, and wherein one of the selectable buttons of the virtual keyboard is a lock key that is selectable to lock the virtual keyboard on the touch-sensitive display and to unlock the virtual keyboard on the touch-sensitive display;

in response to detecting a touch, on the touch-sensitive display, at a location associated with one of the selectable buttons associated with one of a numerical character, a symbol, a punctuation mark, and an emoticon when the virtual keyboard is not locked on the touch-sensitive display, discontinuing display of the virtual keyboard associated with the first selectable option;

in response to detecting selection of one of the selectable buttons associated with one of a numerical character, a symbol, a punctuation mark, and an emoticon when the virtual keyboard is locked on the touch-sensitive display, maintaining display of the virtual keyboard associated with the first selectable option;

wherein the mechanical keys of the mechanical keyboard include touch sensors to detect touches on the mechanical keys such that the mechanical keys are depressible to provide input to the processor and are touch-sensitive to provide further input to the processor.

7. A non-transitory computer-readable medium having computer-readable code executable by at least one processor of the portable electronic device to perform the method of claim 6.

* * * * *